Feb. 7, 1933.   R. F. KOHR   1,896,902
BRAKE
Filed May 10, 1928   3 Sheets-Sheet 1
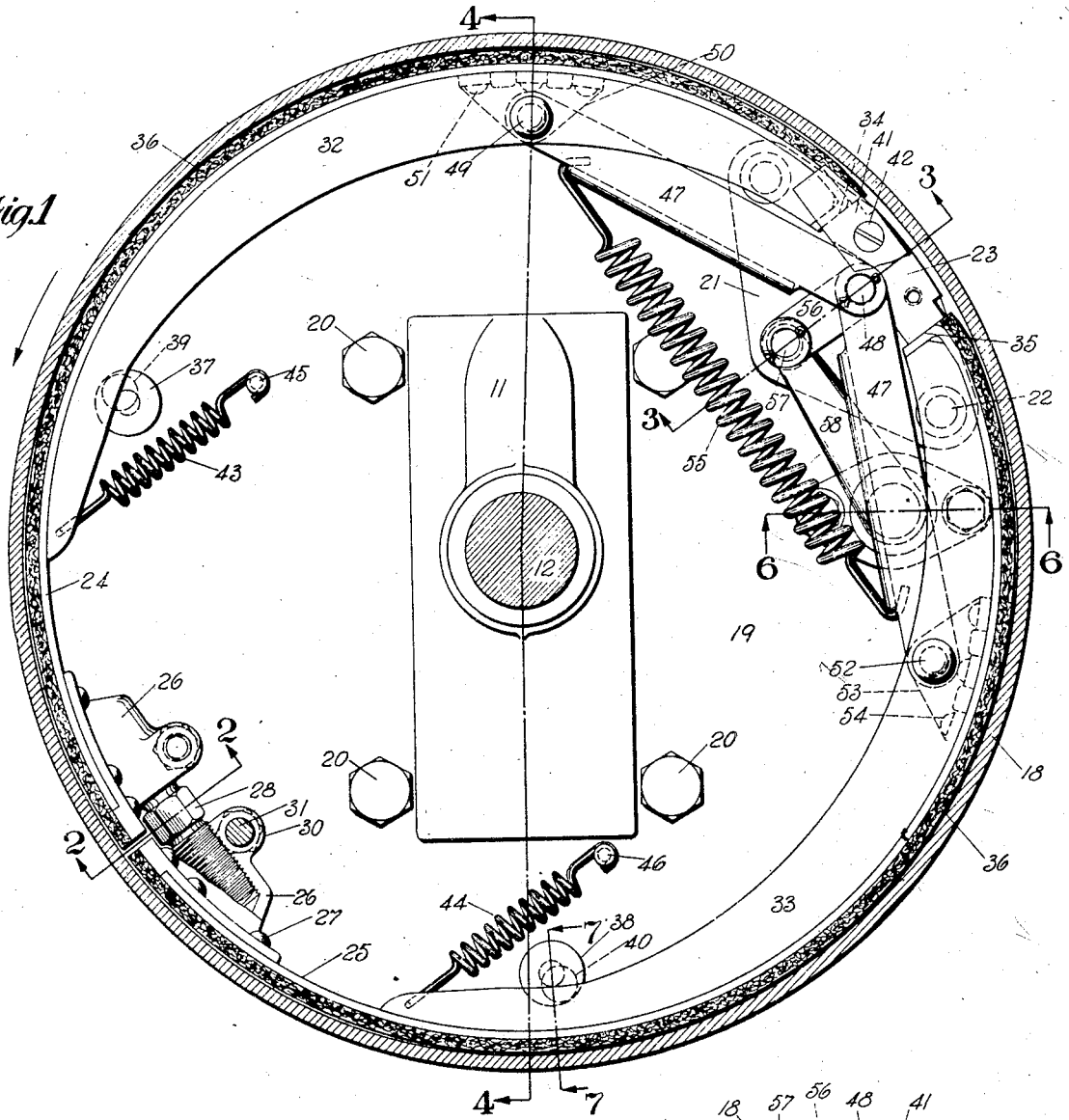
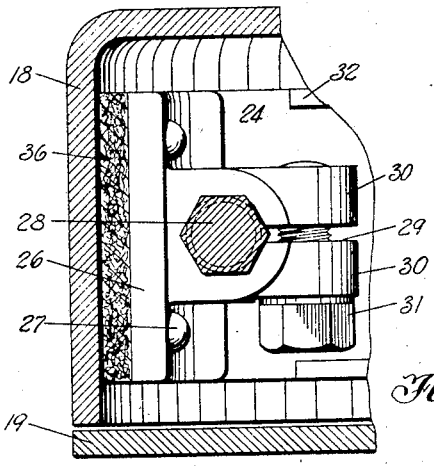
Fig. 2
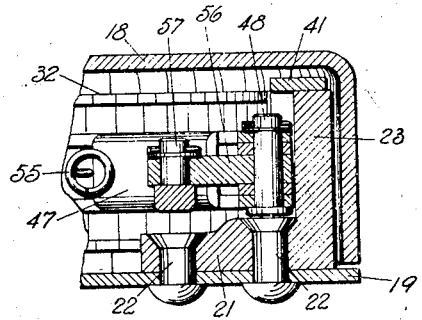
Fig. 3
INVENTOR.
Robert F. Kohr
BY P. W. Pomeroy
ATTORNEY Feb. 7, 1933.  R. F. KOHR  1,896,902
BRAKE
Filed May 10, 1928   3 Sheets-Sheet 2

INVENTOR.
Robert F Kohr
BY
P. W. Pomeroy
ATTORNEY

Feb. 7, 1933.   R. F. KOHR   1,896,902
BRAKE
Filed May 10, 1928   3 Sheets-Sheet 3

INVENTOR.
Robert F Kohr
BY P. W. Pomeroy
ATTORNEY

Patented Feb. 7, 1933

1,896,902

UNITED STATES PATENT OFFICE

ROBERT F. KOHR, OF SOUTH BEND, INDIANA, ASSIGNOR TO THE STUDEBAKER CORPORATION, OF SOUTH BEND, INDIANA, A CORPORATION OF NEW JERSEY

BRAKE

Application filed May 10, 1928. Serial No. 276,636.

This invention relates to brakes for motor vehicles and particularly to brakes of the internal servo type.

So far as applicant is aware, servo brakes of the type used in the past have always had one inherent characteristic which no one heretofore has even been able to eliminate. The construction of these brakes has always been such that both ends of the brake element simultaneously move outwardly away from the stop member to engage the brake drum. At the instant of initial engagement with the brake drum, the brake element rotates therewith and one end of the brake element suddenly abuts against the stop member with a very pronounced clicking sound. This clicking sound is very disturbing to the occupants of the vehicle and especially so in heavy city traffic where it is necessary to apply the brakes several times in a single block. It is therefore, the principal object of this invention, to provide a brake of the servo type with a brake element, the ends of which do not move into engagement with the brake drum until an intermediate portion thereof has engaged with the drum.

Another object is to provide a brake mechanism which operates as efficiently when the vehicle is moving in a rearward direction as when it is moving in a forward direction.

Another object is to provide a brake of the servo type with a brake element wherein one end only moves away from the stop member during engagement of the brake element with the brake drum, the other end remaining in contact with the stop member during complete expansion of the brake element.

Another object is to provide a brake of the servo type with a free-floating brake element, a stop member engaging the ends of the brake element, and a toggle mechanism adapted to move the central portion of the brake element into engagement with the brake drum before moving an end of the same into engagement with the brake drum.

A further object is to provide a vehicle brake of the servo type with a floating brake element comprising two semi-circular brake members, two adjacent ends of which normally abut against a stop member and the other adjacent ends being provided with threaded brackets connected by a double-ended screw to provide an adjustment for the brake element.

These being among the objects of the present invention, the same consists of certain features of construction and combinations of parts to be hereinafter described with reference to the accompanying drawings, and then claimed, having the above and other objects in view.

In the accompanying drawings which illustrate a suitable embodiment of the present invention, Figure 1 is a section taken just inside the brake drum head of a brake incorporated in the left front wheel of a motor vehicle, showing the brake element and operating mechanism therefor in elevation.

Figure 2 is an enlarged section taken on the line 2—2 of Figure 1 showing the means for adjusting the circumferential length of the brake element.

Figure 3 is an enlarged section taken on the line 3—3 of Figure 1 showing the stop member.

Figure 4:
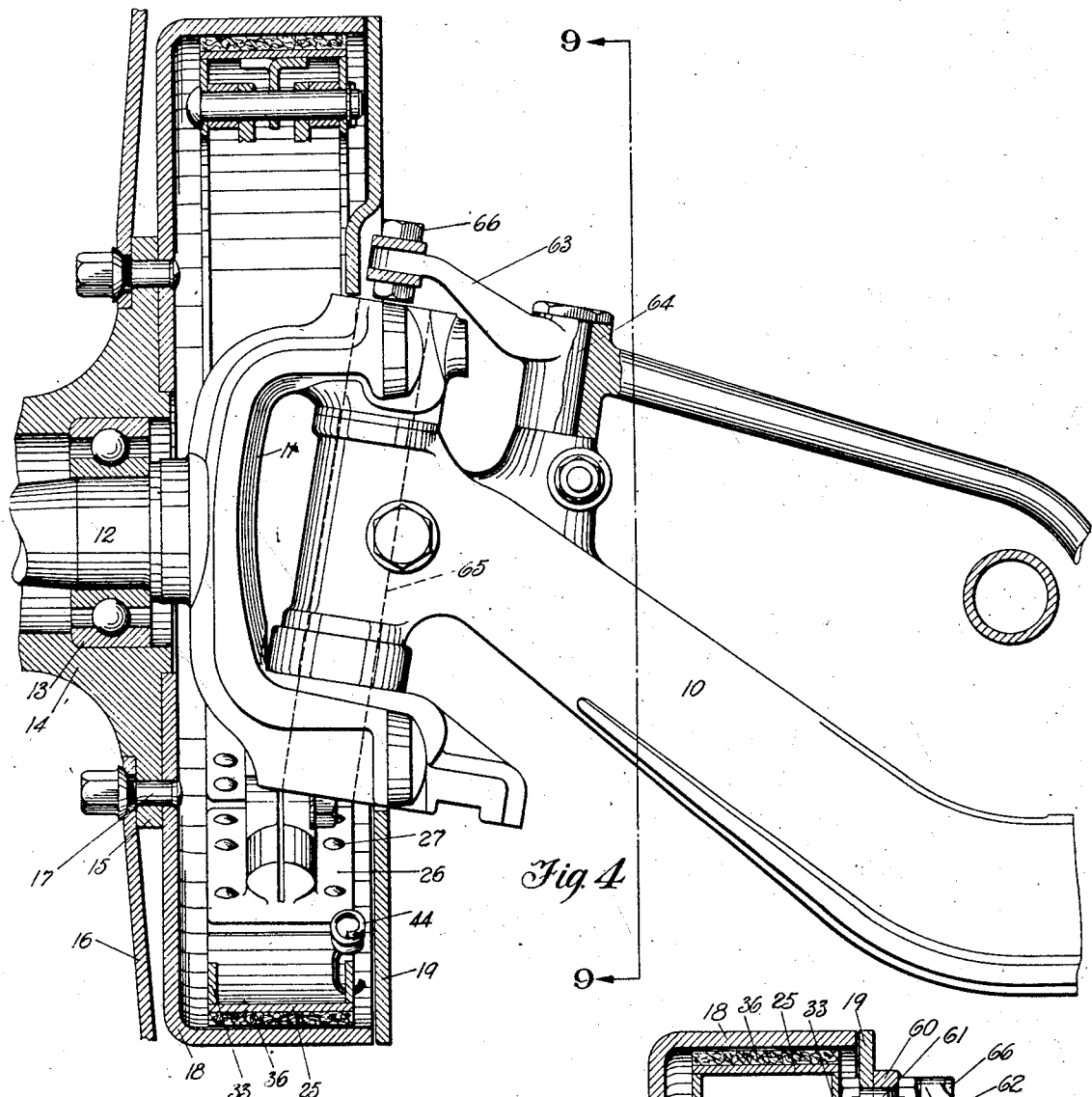
Figure 4 is a view taken on the line 4—4 of Figure 1 showing the brake in transverse section.
Figure 6:
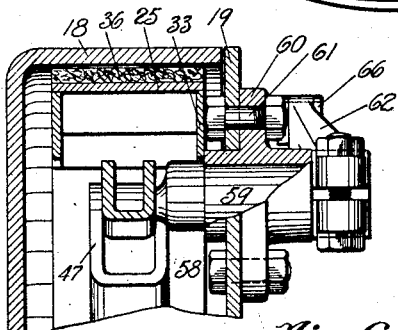
Figure 6 is a section taken on the line 6—6 of Figure 1 showing the toggle operating member and adjacent parts.
Figure 5:
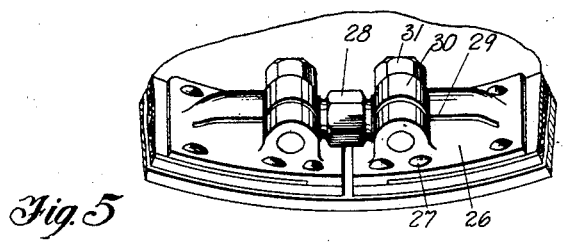
Figure 5 is a perspective view of the brake element adjusting means.
Figure 9:
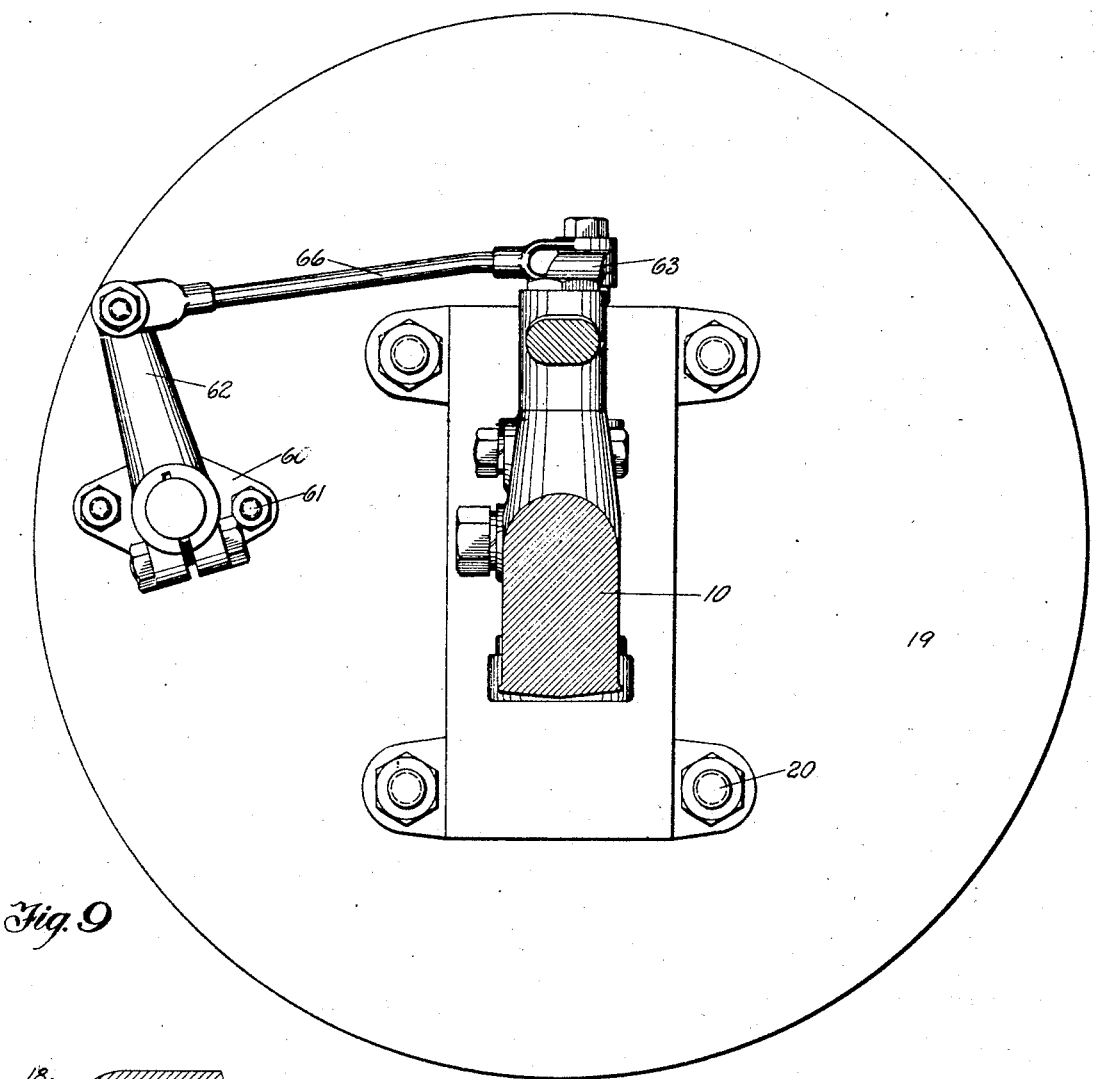
Figure 9 is an elevational view taken approximately on the line 9—9 of Figure 4 looking toward the backing plate to show the means for rotating the operating shaft.

Referring to the accompanying drawings in which like numerals refer to like parts throughout the several views, the embodiment of this invention is shown for the purpose of illustration in connection with the front wheel brake mechanism of a motor vehicle. A vehicle front axle 10 is shown in Figure 4 as having a T-shaped end to which a conventional steering knuckle 11 is suitably pivoted by a pivot pin 65, the knuckle 11 being provided with an outwardly-extending stub axle 12. The axle 12 receives a bearing 13 which rotatably supports a wheel hub 14. The wheel hub 14 is provided with a flange 15 against which the wheel 16 abuts and is secured thereto by bolts 17 which also serve to support and secure the brake drum 18 to the hub 14 in concentric relationship.

A brake drum dust cover or backing plate 19 is secured by bolts 20 (shown in Figure 1) to the steering knuckle 11 in concentric relation with the drum 18 and as close as possible thereto in order to prevent dirt and foreign particles from getting into the brake mechanism and injuring the operating parts.

An L-shaped bracket 21 (see Figure 3) is secured by rivets 22 to the backing plate 19 in such a position that one leg thereof extends outwardly perpendicular to the backing plate 19 to provide a stop 23 for the ends of the brake element which is positioned concentrically within the brake drum 18. The brake element comprises two semi-circular resilient bands 24 and 25. The band 24 is provided with a pair of spaced radial stiffening ribs 32 of varying depth which extend for the greater part of its length and are welded or secured thereto in any suitable manner. The free end of the band 24 preferably extends beyond the ends of the ribs 32 and is bent radially inwardly into abutting relationship with the ends of ribs 32 to provide an abutment face 34. The band 25 is likewise provided with spaced radial stiffening ribs 33 which extend for the greater part of its length and one of the ends of the band 25 is extended beyond and bent radially inwardly to abut against the ends of the ribs 33 to provide an abutment face 35. The brake element, therefore, is provided with two friction members which are preferably channel-shaped and rigid for a greater part of their lengths, and which are rectangular and resilient for the remainder of their lengths.

The resilient ends of the bands 24 and 25 are each provided with a bracket 26 secured thereto by rivets 27 or any other suitable means and each bracket 26 is provided with a longitudinally-threaded opening which receives one end of a double-ended screw 28, the other end of the screw being received in the opening in the adjacent bracket 26. The metal forming the wall of the longitudinal opening in each bracket 26 is slotted at 29 and is provided with projecting ears 30 at each side of the slot 29. A cap screw 31 threaded through these ears 30 so that when it is turned, the ears 30 will be drawn toward each other to clamp around and grip the double-ended screw 28 in order to hold the same against inadvertent rotation. The function of the brackets 26 and the screw 28 which interconnects them is to provide means for adjusting the length of the brake element in order to provide a more accurate adjustment of the same by increasing or decreasing the circumferential length thereof, and to provide means for rigidly interconnecting the two friction members. When the brake element is in normal-inoperative position the abutment faces 34 and 35 abut against opposite sides of the stop member 23. Each of the bands 24 and 25 is covered with a facing 36 of friction material secured thereto by any suitable securing means.

Figure 7:
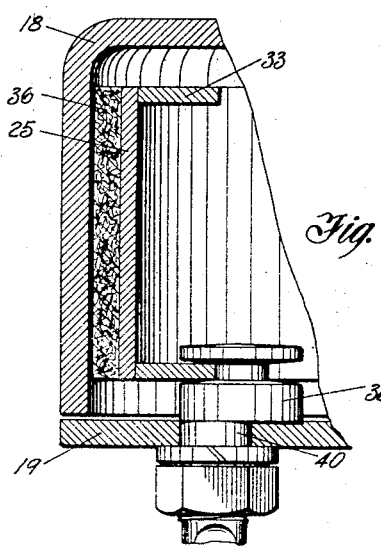
Figure 7 is a section through one of the brake element adjusting spools taken on the line 7—7 of Figure 1.

Grooved adjusting spools 37 and 38 eccentrically positioned on screws 39 and 40 extending through the backing plate 19 as shown in Figure 7 respectively engage the brake element ribs 32 and 33 adjacent to the backing plate 19 to guide the brake element and to provide means for adjusting the same in order to obtain the proper clearance between the brake element friction facings 36 and the brake drum 18. The spools 37 and 38 also hold the lower portion of the brake element against movement transversely of the brake drum 18, the upper portion of the brake element being guided and held against transverse movement by means of the bracket 21 and a plate 41 secured to the stop portion 23 of the bracket 21 by screws 42. Opposite sides of the free ends of the brake element abut against and slide against the spaced surfaces of the two members 21 and 41. Suitable coil springs 43 and 44 having their ends respectively hooked over pins 45 and 46 secured to the backing plate 19 and through the inner reinforcing ribs 32 and 33 of the brake element normally exert a pull on the brake element to hold the same in engagement with the guide spools 37 and 38.

Figure 8:
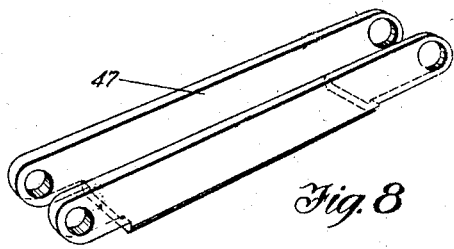
Figure 8 is an enlarged perspective view of one of the toggle links.

The brake element is preferably moved into engagement with the brake drum 18 by means of a toggle mechanism which comprises a pair of links 47 formed from pressed metal to a U-shaped section as shown in Figure 8, adjacent ends of which are telescoped and pivoted together by means of a pin 48. The opposite end of one of the links 47 is pivoted by a pin 49 to a T-shaped bracket 50 secured by rivets 51 to the band 24 and positioned between the ribs 32. The opposite end of the other link 47 is simlarly pivoted by a pin 52 to a T-shaped bracket 53 secured between the ribs 33 to the band 25 by suitable rivets 54. A coil spring 55 having its ends hooked through the links 47 normally holds the links in the angular position shown in Figure 1 in order to draw the ends of the brake element toward each other so that abutment faces 34 and 35 of the ends thereof normally engage the opposite sides of the stop member 23. A short link 56 positioned between the walls of the inner bracket 47 is pivoted to the pin 48 and extends radially inwardly therefrom as shown in Figure 3. The free end of this link 56 is pivoted by means of a pin 57 to a lever 58 which is rigidly secured to one end of a rotatable shaft 59 extending through the backing plate 19. The shaft 59 is preferably journaled within a suitable bushing 60 secured to the backing plate 19 by bolts 61 and is provided with a lever arm 62 secured to its outer end. A double arm lever 63 is pivoted on a pin 64 carried by the front axle 10 having its axes parallel to the axis of the king pin 65 which pivots the steering knuckle to the end of the front axle 20. One of the ends of the lever 63 is connected by a link 66 to the lever 62 and the other end is connected by any suitable means to a brake foot pedal or hand lever (not shown) or to any other suitable source of braking pressure.

The brake shown and just described operates entirely different than any of the servo brakes of which I am aware and has many advantages over the same, the principal advantage being to eliminate the clicking sounds produced by one end of the brake element suddenly abutting against the stop member.

Rotation of the lever 58 in a counter-clockwise direction by the shaft 59 and associated parts causes the link 56 to move radially inwardly against the tension of the springs 43 and 44 to bodily shift the entire brake element without expanding the same until that portion of the friction facings 36 diametrically opposite the free ends thereof engages the brake drum, the coil spring 55 being of sufficient strength to prevent the ends of the brake element from moving away from the stop member during the bodily shifting movement of the same. During this movement the abutment faces 34 and 35 of the bands 24 and 25 slide radially inwardly along the sides the stop member 23. As an example, the brake drum 18 will be considered as moving in a counter-clockwise direction. In this case, as soon as that portion of the brake element diametrically opposite the free ends thereof engages the brake drum 18, the entire brake element rotates with the drum 18 until the band 25 is completely engaged with the drum 18, and further movement of the lever 58 then operates the toggles 47 which may be termed the secondary movement. This secondary movement causes the brake band 24 to move outwardly away from the stop member 23 to completely engage the drum 18 but the end 35 of the band 25 does not move away from the stop member as the band 25 is in contact with the drum 18 before the band 24 is engaged with the same. As soon as the braking pressure in the lever 58 is released, the coil spring 55 returns the band 24 to normal position so that the abutment face 34 again engages the side of the stop member 23 and the springs 43 and 44 draw the central portion of the brake element radially inwardly out of contact with the drum 18 and into normal engagement with the abutting spools 38.

The brake operates in the same manner when the drum 18 is rotating in the opposite direction with the exception that the abutment face 34 of the band 24 does not move out of contact with the stop member 23 during the secondary or complete braking action.

The action of the brake in this invention can be summarized into three distinct steps, the first being that the brake element is bodily shifted as a whole until the portion thereof directly opposite its free ends engages the drum, the ends of the element being held in engagement with the stop member and sliding against the same. Secondly, the brake element rotates with the drum until one half of the same is in complete engagement with the drum, and thirdly, the other half of the brake element is moved into engagement with the drum without disturbing the position of the first mentioned half. In other words, one end of the brake element is always in engagement with the stop member with the result that there is no possible chance for this end to suddenly strike the stop member during rotation of the brake element and produce a clicking sound. The advantage of having a servo or self-energizing brake operate in this manner is readily apparent, as the clicking noises previously mentioned are eliminated. Another advantageous feature of this brake is that it is as effective when the drum is rotating in a reverse direction as when it is rotating in a forward direction.

It is to be understood however, that certain changes may be made in the specific embodiment of the invention described without departing from the spirit and substance of the broad invention, the scope of which is commensurate with the appended claims.

What I claim is:

1. In a vehicle brake, a rotatable drum, a free floating brake element engageable therewith comprising, a pair of semi-circular friction members having rigid radial reinforcements for the greater portion of their lengths and resilient portions for the remainder of their lengths, threaded brackets secured to said flexible portions, and screw means having oppositely threaded ends threaded into said brackets to rigidly interconnect said friction members and to adjust the space between the same.

2. In a vehicle brake, a rotatable drum, a free floating brake element engageable therewith comprising, a pair of semi-circular friction members having rigid radial reinforcements of a portion of their lengths and resilient portions at the ends thereof, brackets secured to said flexible portions and a screw having oppositely threaded ends threaded into said brackets to rigidly interconnect said friction members and to adjust the space between the same.

3. In a brake element for a vehicle brake, a pair of semi-circular friction members having adjacent, flexible ends spaced from each other, and means rigidly inter-connecting said flexible ends adapted to change the circumferential length of said brake element.

4. In a brake element for a vehicle brake, a pair of semi-circular friction members having adjacent, flexible ends spaced from each other, and means rigidly inter-connecting said flexible ends, said means including a screw so related to other elements of said means that rotation of said screw changes the circumferential length of said brake element.

5. In a brake element for a vehicle brake, a pair of semi-circular friction members having adjacent, flexible ends spaced from each other, and means rigidly inter-connecting said flexible ends, said means comprising internally threaded brackets rigidly secured upon said adjacent, flexible ends, and a double ended screw having oppositely threaded ends threaded into said brackets, whereby rotation of said screw changes the circumferential length of said brake element.

6. In a brake element for a vehicle brake, a pair of semi-circular friction members having adjacent, flexible ends spaced from each other, internally threaded brackets rigidly secured upon said adjacent, flexible ends, an integral double ended screw having a wrench engageable center portion and oppositely threaded ends threaded into said brackets, whereby rotation of said screw changes the circumferential length of said brake element, and means carried by said brackets for normally holding said screw against rotation.

Signed by me at South Bend, Indiana this 7th day of May, 1928.

ROBERT F. KOHR.